US012442525B2

(12) United States Patent
Van Rijswijk et al.

(10) Patent No.: US 12,442,525 B2
(45) Date of Patent: Oct. 14, 2025

(54) OUTDOOR LUMINAIRE FOR A STREETLIGHT

(71) Applicant: SIGNIFY HOLDING B.V., Eindhoven (NL)

(72) Inventors: Nicolaas Antonie Van Rijswijk, Oss (NL); Noud Johannes Fleuren, Baarlo (NL); Kwan Nai Lee, Veldhoven (NL); René Cornelis Reuser, Velp (NL); David Cavaliere, Quebec (CA); Ronald Johannes Gelten, Geldriop (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/851,242

(22) PCT Filed: Mar. 26, 2023

(86) PCT No.: PCT/EP2023/057749
§ 371 (c)(1),
(2) Date: Sep. 26, 2024

(87) PCT Pub. No.: WO2023/186754
PCT Pub. Date: Oct. 5, 2023

(65) Prior Publication Data

US 2025/0198610 A1 Jun. 19, 2025

(30) Foreign Application Priority Data

Mar. 31, 2022 (EP) .................................... 22166092

(51) Int. Cl.
*F21V 29/71* (2015.01)
*F21S 8/08* (2006.01)
(Continued)

(52) U.S. Cl.
CPC ............ *F21V 29/713* (2015.01); *F21S 8/086* (2013.01); *F21V 15/01* (2013.01); *F21V 29/508* (2015.01);
(Continued)

(58) Field of Classification Search
CPC ........ F21V 29/74; F21V 29/745; F21V 29/76; F21V 29/763; F21S 8/08; F21S 8/085; F21S 8/086
See application file for complete search history.

(56) References Cited

U.S. PATENT DOCUMENTS 10,012,375 B1 * 7/2018 Salessi .................. F21V 29/503
10,935,198 B2 3/2021 McDowell et al.
(Continued)

FOREIGN PATENT DOCUMENTS

CN 202266946 U 6/2012
CN 210219487 U 3/2020
(Continued)

*Primary Examiner* — Alexander K Garlen

(57) ABSTRACT

An outdoor luminaire with wireless functionality. A canopy is coupled to an uppermost surface or portion of a luminaire housing containing a light source. The volume bounded by the canopy and the luminaire housing defines a canopy enclosure. This canopy enclosure encloses a portion of a first heatsink (for the luminaire housing), a wireless module, an antenna system and a second heatsink for the wireless module. The canopy also comprises one or more air inlets and one or more air outlets, to allow air to flow into and out of the canopy enclosure. The first heatsink comprises one or more fins that extend toward an upper portion of the canopy.

12 Claims, 3 Drawing Sheets

(51) Int. Cl.

| | |
|---|---|
| ***F21V 15/01*** | (2006.01) |
| ***F21V 29/508*** | (2015.01) |
| ***F21V 29/76*** | (2015.01) |
| ***F21V 29/83*** | (2015.01) |
| ***F21W 131/103*** | (2006.01) |

(52) U.S. Cl.
CPC ............ *F21V 29/763* (2015.01); *F21V 29/83* (2015.01); *F21W 2131/103* (2013.01)

(56) References Cited

U.S. PATENT DOCUMENTS

| | | | | | |
|---|---|---|---|---|---|
| 2009/0103307 | A1* | 4/2009 | Shu | F21V 5/007 | 362/294 |
| 2014/0211487 | A1* | 7/2014 | Spiro | F21V 29/74 | 362/382 |
| 2014/0226339 | A1* | 8/2014 | Kinnune | F21V 29/505 | 362/294 |
| 2014/0247590 | A1* | 9/2014 | Wilcox | F21V 29/83 | 362/230 |
| 2015/0345772 | A1* | 12/2015 | Duckworth | F21S 8/085 | 362/373 |
| 2016/0305640 | A1 | 10/2016 | Brown et al. | | |
| 2016/0341398 | A1* | 11/2016 | Kim | F21V 7/0058 | |
| 2018/0172243 | A1 | 6/2018 | Clynne et al. | | |
| 2018/0356083 | A1* | 12/2018 | Duong | H05K 1/0274 | |

FOREIGN PATENT DOCUMENTS

| | | | |
|---|---|---|---|
| KR | 20180017743 | A | 2/2018 |
| KR | 20180062846 | A | 6/2018 |

* cited by examiner

OUTDOOR LUMINAIRE FOR A STREETLIGHT

CROSS-REFERENCE TO PRIOR APPLICATIONS

This application is the U.S. National Phase application under 35 U.S.C. § 371 of International Application No. PCT/EP2023/057749, filed on Mar. 26, 2023, which claims the benefit of European Patent Application No. 22166092.1, filed on Mar. 31, 2022. These applications are hereby incorporated by reference herein.

FIELD OF THE INVENTION

The present invention relates to the field of luminaires, and in particular to luminaires for a streetlight.

BACKGROUND OF THE INVENTION

Luminaires for streetlights are well known, and have been continuously developed for a number of decades. A recent trend is the use of light emitting diode systems as light sources in such streetlights. A cobra head design is common to ensure that light emitted by a streetlight is emitted downwards, i.e., towards the ground, thereby reducing light pollution.

It has been proposed to integrate an antenna system and wireless module with a luminaire for a streetlight, e.g., for the purposes of providing wireless connectivity to individuals in the vicinity of the streetlight and/or to form a connectivity grid.

It would be advantageous to improve the performance, functionality and/or efficiency of a luminaire for a streetlight that is able to provide such connectivity.

CN202266946U discloses a modular LED street light with a receiving antenna electrically connected with an intelligent control device.

KR20180062846A and KR20180017743A each discloses a LED luminaire with a wireless module.

US20160305640A1 discloses LED Lamp with active chamber cooling.

SUMMARY OF THE INVENTION

The invention is defined by the claims.

According to examples in accordance with an aspect of the invention, there is provided an outdoor luminaire for a streetlight.

The outdoor luminaire comprises a luminaire housing comprising a light exit window and a first heatsink comprising a first set of fins; and a light source, positioned in the luminaire housing between said light exit window and said first heatsink, and configured to emit light through the light exit window.

The outdoor luminaire also comprises a canopy comprising an upper portion that covers a portion of an uppermost surface of the luminaire housing and a side portion configured to connect the upper portion of the canopy to the luminaire housing to thereby form a canopy enclosure.

The outdoor luminaire also comprises: an antenna system, housed by the canopy enclosure, for transmitting and/or receiving wireless signals; a wireless module, housed by the canopy enclosure, communicatively coupled to the antenna system and configured to control the transmission of transmitted wireless signals by the antenna system and/or process receiving wireless signals received at the antenna system; and a second heatsink, at least partly housed by the canopy enclosure, in thermal contact with the wireless module.

A portion of the first set of fins is housed by the canopy enclosure. The enclosed portion may comprise only part of the first set of fins or all of the first set of fins.

The upper portion and/or side portion of the canopy comprise one or more air inlets, for allowing the passage of external air into the canopy, and one or more air outlets for allowing the passage of internal air, being external air drawn through the air inlets and heated by the first and/or second heatsinks, out of the canopy.

The first set of fins is configured to extend toward the upper portion of the canopy.

The present disclosure provides a luminaire with an "add-on" or additional element, compared to conventional luminaires, for wireless communications. The additional element is formed from a canopy that covers the uppermost portion of a luminaire housing (which holds the light source). The canopy is formed from an upper portion and a side portion. The upper and side portions of the canopy, together with the uppermost surface of the luminaire housing, together form or define the bounds of a canopy enclosure.

The canopy enclosure is therefore a volume that is bound or defined by the upper and side portions of the canopy (i.e., the canopy itself) and the covered part of the uppermost surface of the luminaire housing. At least some of the first heatsink of the luminaire housing is present within the canopy enclosure.

The canopy enclosure also encloses additional components for the add-on element, particularly a wireless module, an antenna system and a second heatsink for the wireless module.

Heat from the first and second heatsinks is present in the canopy enclosure. The air inlet(s) and outlet(s) facilitate a mechanism for expelling or transferring heat out of the canopy enclosure. In particular, the inlet(s) and outlet(s) provide a path for cool air to enter the canopy enclosure (via the inlet(s)), be heated by the heatsinks before being expelled out of the outlets. In other words, the inlet(s) and outlet(s) provide ventilation for the heatsinks contained in the canopy enclosure, thereby improving the dissipation of heat generated by the wireless module and/or the light source out of the canopy enclosure by way of providing suitable air flow paths.

The skilled person will appreciate that the terms "upper" and "lower" are relative and used to distinguish elements from one another. In particular, these terms are used to convey the expected position of such elements (compared to other elements) when the luminaire is installed to a streetlight in an expected orientation (e.g., so that light is emitted towards a ground surface). The terms "upper" or "lower" could be replaced with ordinal numbers (e.g., "first", "second" etc.).

The outdoor luminaire may comprise a planar element mechanically connected to the first heatsink. The planar element is arranged to cover a top of a portion of the first set of fins.

The planar element is preferably thermally conductive and is thermally coupled to the first heatsink. This provides an additional route or path for heat to be dissipated from the first heatsink.

The planar element is preferably thermally coupled to the second heatsink. This approach provides a mechanism for transferring heat from the first heatsink to the second heatsink. This is advantageous in effectively increasing the surface area of the first heatsink, to improve the dissipation of heat from the luminaire housing. The heat generated by the light source will typically be greater than the heat generated by the wireless module (due to natural differences in efficiency). Accordingly, this approach provides a route for dissipating heat from the first heatsink to the second heatsink for distributing heat more evenly throughout the canopy enclosure and improving the thermal management of the outdoor luminaire.

In some embodiments, the planar element is (directly) mechanically connected to the wireless module. This means that the planar element can at least partially act as a heatsink for the wireless module and/or provide structural support and/or positioning for the wireless module.

In some examples, the planar element covers between 20% and 80% of the first heatsink. This embodiment encourages air flow around the sides of the planar element towards the upper portion of the housing. This thereby provides a path for the movement of heated air away from the first heatsink (as air will naturally rise towards the top of the canopy enclosure). In this way, maintenance of a chimney effect can be achieved whilst providing the planar element.

In some examples, the antenna system comprises one or more antenna modules for transmitting and/or receiving wireless signals for the wireless module, each antenna modules being electrically connected to the wireless module. Each antenna module may, for instance, be a different antenna for the antenna system.

In some examples, there is provided, for each antenna module, an antenna mount configured to support the antenna module. The antenna mount may be configured to extend toward the upper portion of the canopy. Preferably, the antenna module is made from a thermally conductive material, such as metal.

Where present, each antenna mount may be integrally formed with the planar element. This provides a mechanism for defining or setting the location of the antenna modules using the planar element. This increases an ease of manufacturing the outdoor luminaire to achieve a desired wireless coverage with the antenna modules, as setting the position of the antenna mounts is performed with relative ease by performing a single positioning step with the planar element (e.g., rather than individually positioning steps for each antenna module).

Optionally, the planar element and each antenna mount is formed from a same continuous sheet, wherein one or more bent portions of the continuous sheet define one or more antenna mounts and a non-bent portion of the continuous sheet defines the planar element. This provides a yet further improvement to the ease of manufacturing the outdoor luminaire with a desired wireless coverage for the antenna system.

The second heatsink may comprise a second set of fins, which are preferably configured to extend toward the upper portion of the canopy. This approach further encourages and exploits the movement of warm air towards the upper portion of the canopy, to improve the heat dissipation throughout the canopy enclosure.

In some examples, the first set of fins and the second set of fins are angled with respect to one another, i.e., there is a non-zero angle between the first and second set of fins. For instance, the first set of fins and the second set of fins may be perpendicular to one another. This approach encourages the movement and distribution of air within the canopy housing in different directions and directional flows, further improving the thermal management of the luminaire.

Of course, in other examples, the first and second set of fins are aligned in parallel.

The one or more air inlets may be positioned in the side portion of the canopy. The one or more air outlets may be positioned in the upper portion of the canopy. This approach makes use of a chimney or stack effect to improve the ventilation of, or dissipation of heat from, the canopy enclosure.

There is also provided a streetlight comprising: a pole or mast; and any herein described outdoor luminaire mechanically mounted to the pole or mast.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
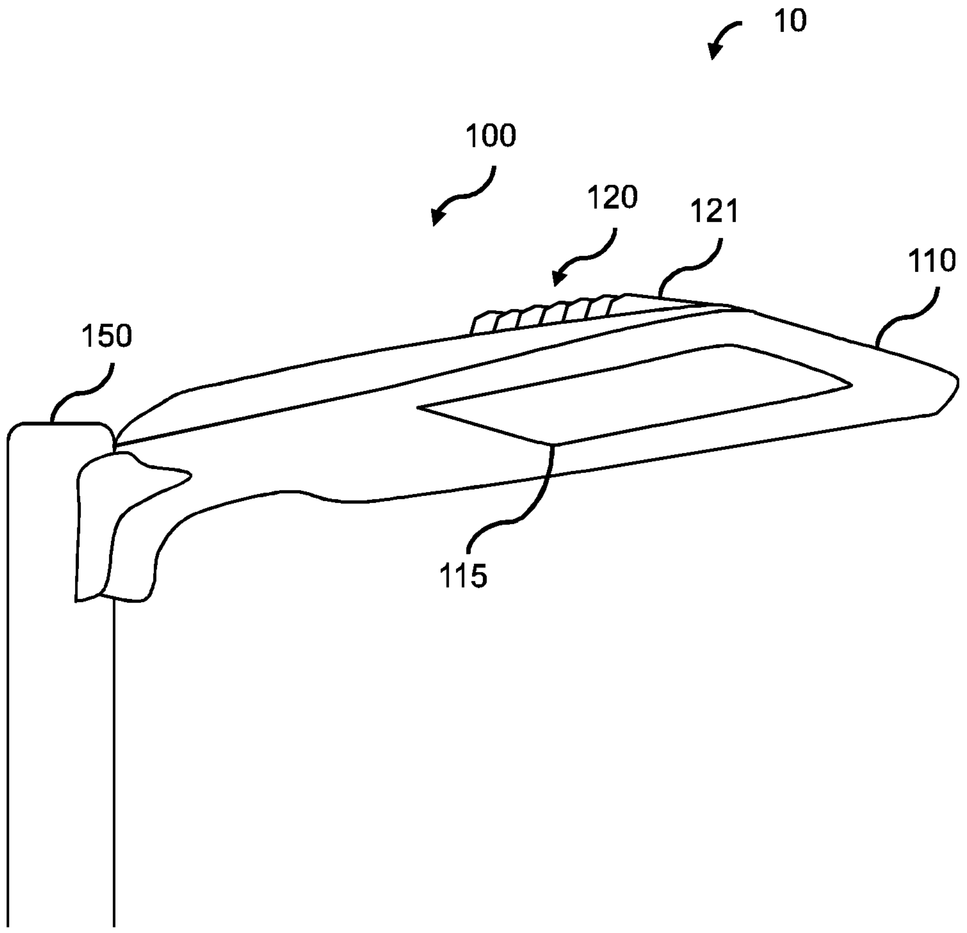
FIG. 1 illustrates a streetlight.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an outdoor luminaire with wireless functionality. A canopy is coupled to an uppermost surface or portion of a luminaire housing containing a light source. The volume bounded by the canopy and the luminaire housing defines a canopy enclosure. This canopy enclosure encloses a portion of a first heatsink (for the luminaire housing), a wireless module, an antenna system and a second heatsink for the wireless module. The canopy also comprises one or more air inlets and one or more air outlets, to allow air to flow into and out of the canopy enclosure. The first heatsink comprises one or more fins that extend toward an upper portion of the canopy.

Embodiments are based on the realization that it is possible to supplement a luminaire housing a light source with an additional or add-on element, but that the surface of the luminaire housing can act as a bound(ary) for this add-on element. Embodiments also appreciate that, in such circumstances, heat dissipated from the luminaire housing will be present in such a canopy enclosure, and needs further dissipation, e.g., to avoid overheating the wireless module. Approaches make use of air flow within the canopy enclosure to expel heat.

Approaches can be employed in any environment in which wireless connectivity for an outdoor luminaire of a streetlight is desired, e.g., to provide wireless connectivity for nearby mobile devices.

In the context of the present invention, a "thermally conductive" element means that the element is made from a material configured or designed for conducting heat, i.e. having a high thermal conductivity. Suitable materials may include any material whose thermal conductivity at 25° C. is greater than 10 $Wm^{-1}K^{-1}$, e.g., greater than 20 $Wm^{-1}K^{-1}$ e.g. greater than 50 $Wm^{-1}K^{-1}$ Examples include metals (e.g., copper, brass, iron, aluminum etc.) or some ceramics (e.g., $Si_3N_4$ or BeO).

In the context of the present invention, an "electrically conductive" element means that the element is made from a material configured or designed for conducting electricity, i.e. having a high conductivity or low resistance. Suitable materials may include any material whose conductivity at 20° C. is greater than $1\times10^3$ $Sm^{-1}$, e.g., greater than $1\times10^5$ $Sm^{-1}$, e.g., greater than greater than $1\times10^6$ $Sm^{-1}$. Suitable examples include metals (e.g., copper, iron, aluminum etc.) or some electroceramics.

Approaches for determining the thermal or electrical conductivity of materials are well established in the art, and are not described for the sake of conciseness.

FIG. 1 illustrates a streetlight 10, for the purposes of improved contextual understanding.

The streetlight comprises an outdoor luminaire 100 and a pole 150. The outdoor luminaire 100 is mechanically mounted upon the pole 150, e.g., by way of one or more fastening means.

The outdoor luminaire 100 comprises a luminaire housing 110. The luminaire housing 110 defines a light exit window 115 and a first heatsink 120.

The light exit window 115 is configured to allow the passage of light from inside the housing 110 out of the housing. Preferably, the light exit window 115 is formed of a transparent or translucent material (e.g., glass or plastic). However, in some examples, the light exit window may be formed from a gap or hole in the luminaire housing.

The first heatsink 120 is configured to conduct heat generated by elements contained by the luminaire housing, i.e., by the outdoor luminaire 100, away from the outdoor luminaire 100. The first heatsink comprises a first set of fins 121. Fins provide a reliable and well-established technique for conducting heat away from an object.

The outdoor luminaire further comprises a light source (not visible). The light source is positioned inside the luminaire housing, between the light exit window 115 and the first heatsink 120. Light emitted or generated by the light source is output through the light exit window. Heat generated by the light source (which typically forms about 20%-30% of the energy produced by the light source) is thermally conducted away from the outdoor luminaire 100 by the first heatsink 120.

The luminaire housing 110 thereby forms a light source housing, in that is houses the light source and is configured to dissipate heat generated by the light source.

The present invention provides a mechanism for supplementing the functionality of an outdoor luminaire, whilst maintaining or providing an approach for performing heat or thermal management of the outdoor luminaire.

Figure 2:
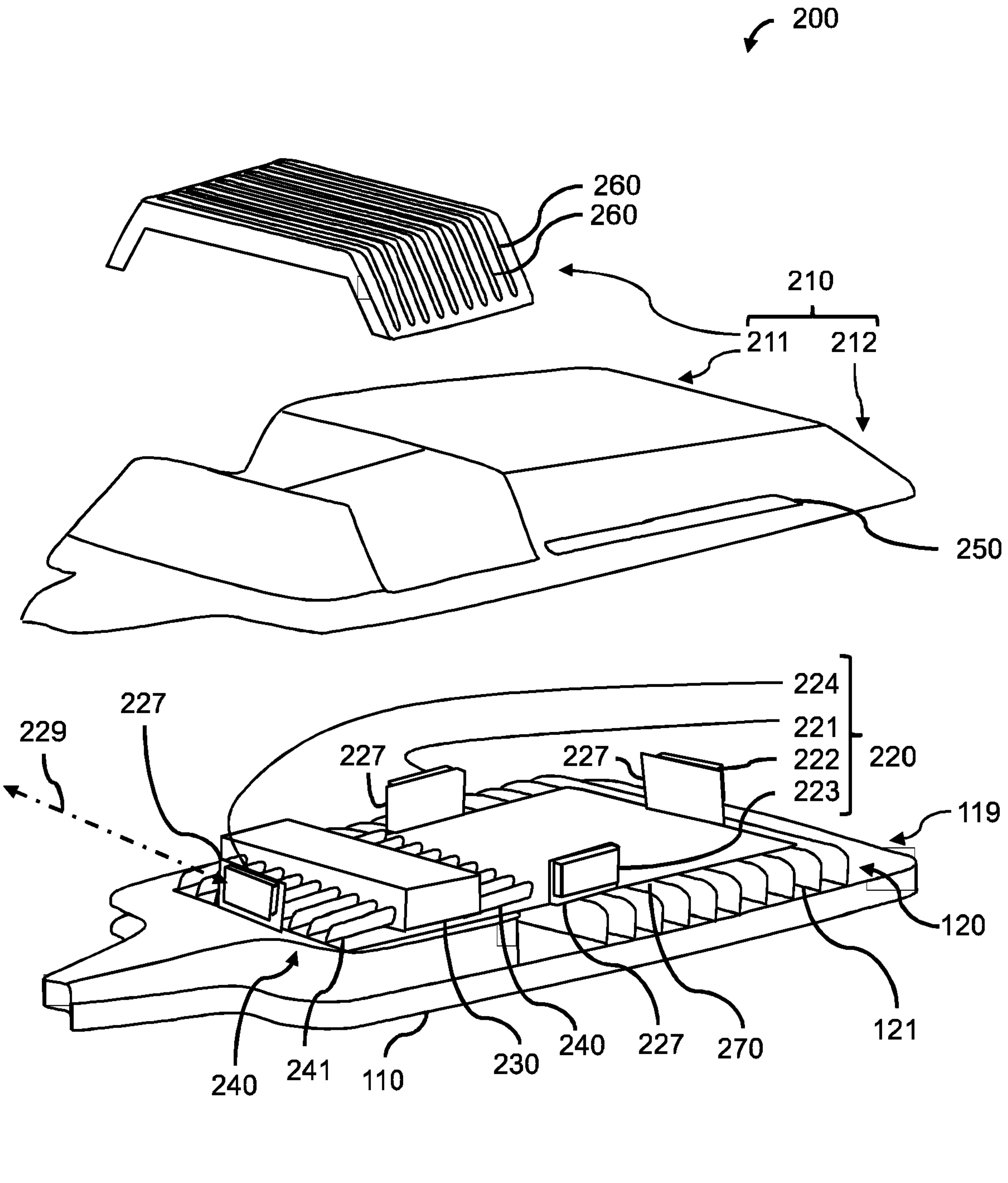
FIG. 2 is an exploded view of a luminaire.

FIG. 2 provides an exploded view of an outdoor luminaire 200 according to an embodiment. The outdoor luminaire 200 may replace the luminaire 100 of the streetlight described with reference to FIG. 1.

The outdoor luminaire 200 comprises a luminaire housing 110, which may be formed in a similar/identical manner to the previously described luminaire housing. Thus, the housing defines a light exit window (not visible) and a first heatsink 120. The first heatsink is configured to conduct heat away from the luminaire housing.

The outdoor luminaire 200 also comprises a light source (not visible). The light source is positioned inside the luminaire housing, between the light exit window and the first heatsink 120. As previously mentioned, the luminaire housing 110 thereby forms a light source housing.

The outdoor luminaire 200 further comprises a canopy 210. The canopy comprises an upper portion 211 and a side portion 212.

The upper portion 211 of the canopy 210 is configured to cover an uppermost surface 119 of the luminaire housing. In particular, the upper portion 211 is configured to cover at least a part of the first heatsink 120 defined by the luminaire housing 110.

The side portion 212 if configured to connect or couple the upper portion 211 to the luminaire housing. This can be performed using a clipping mechanism or other connection means.

The upper portion 211, the side portion 212 and the covered portion of the uppermost surface 119 of the luminaire housing 110 together form or define a canopy enclosure. The canopy enclosure is therefore a volume that is bound by the upper portion 211 and the side portion 212 of the canopy 210, as well as the covered portion of the uppermost surface 119 of the luminaire housing.

The canopy 210 thereby acts as a covering or additional covering to cover at least a portion of the uppermost surface of the luminaire housing. The canopy closure effectively forms a distinct covered volume (separate from the volume enclosed by the luminaire housing). Put another way, the canopy may form a second chamber that is separated from a first chamber (formed in the luminaire housing) by the uppermost surface of the luminaire housing.

The canopy enclosure (defined by the volume enclosed by the canopy 210 and the uppermost surface 119 of the luminaire housing 110) is configured to house a portion (e.g., part or all) of the first set of fins of the first heatsink 120. Thus, at least some of the heat produced or conducted from the luminaire housing 110 (e.g., originally generated by the light source within the housing 110) is introduced into the canopy enclosure.

The outdoor luminaire 200 further comprises an antenna system 220, which is housed or contained within the canopy enclosure. Thus, the antenna system 220 is formed within a volume bounded by the upper portion 210 of the canopy, the side portion 212 of the canopy and the uppermost surface 119 of the luminaire housing 110. The antenna system 220 is configured to transmit and/or receive wireless signals 229.

In the illustrated example, the antenna system 220 comprises a plurality of four antenna modules 211, 212, 213, 214. However, the antenna system 220 may comprise any number of antenna modules, e.g. a single antenna module, two antenna modules, three antenna modules or more than four antenna modules.

Each antenna module may be mounted on or supported by a respective antenna mount 227. Each antenna mount 227 may be configured to extend towards the upper portion of the canopy.

The outdoor luminaire 200 further comprises a wireless module 230. The wireless module is communicatively coupled to the antenna system 220. The wireless module 230 is configured to control the transmission of wireless signals 229, such as electromagnetic signals like radio signals, by the antenna system 220. The wireless module 230 is also configured to process received wireless signals obtained by the antenna system 220.

The wireless module 230 may, for instance, comprise a modem, a processing unit and/or an input/output unit. Suitable examples of wireless modules for handling and processing wireless signals are well established in the art, and have not been described in detail for the sake of clarity.

The wireless signals 229 controlled by the wireless module may operate according to any known wireless communication protocol. Suitable wireless communication protocols include an infrared link, ZigBee, Bluetooth, a wireless local area network protocol such as in accordance with the IEEE 802.11 standards, a 2G, 3G, 4G, 5G or 6G telecommunication protocol, and so on. Other formats will be readily apparent to the person skilled in the art.

In some examples, the wireless signals 229 transmitted and/or received by the wireless module 230 and antenna system 220 are unrelated to the operation of the light source (not shown). In particular examples, the antenna module 220 and the wireless module 230 may act as a node for a network of nodes for providing wireless coverage within an area covered by the network of nodes. Thus, the antenna module 220 and the wireless module 230 may be configured to act as a node as part of a wireless mesh network.

Of course, in other examples, the wireless signals 229 transmitted and/or received by the wireless module 230 and antenna system 220 may be related to the operation of the light source. Thus, the two modules/systems may act together to provide information to controlling one or more parameter or properties of the light source.

Each antenna module 221, 222, 223, 224 of the antenna system 220 may provide an antenna for the wireless module 230. The line of sight of the antenna module may define a range of directions from which wireless signals are received at and/or output by the antenna module.

To achieve improved range of sensitivity to wireless signals, the antenna system may be configured, e.g., through appropriate selection and placement of any antenna module (s) 221, 222, 223, 224, such that the combined line of sight for the antenna system 220 covers a 360° range in the horizontal plane.

By way of example, for an antenna system comprising four antenna modules, the antenna modules may be aligned in a cross-shaped arrangement. In such a cross-shaped arrangement the angle between the line of sight of antenna modules may be 90° (i.e. ß=) 90°. In this way, the radiation patterns of the four antenna modules, the radiation patterns typically having a sending/receiving angle in the horizontal plane of about 90°, is effectively able to cover at least a 270° range, such as a 360° range, in the horizontal plane for improved sensitivity.

The outdoor luminaire 200 further comprises a second heatsink 240, a portion of which is housed by the canopy enclosure, in thermal contact with the wireless module 230.

Thus, the second heatsink is configured to conduct and release heat generated by the wireless module. At least some of the heat output by the second heatsink is passed into the canopy enclosure.

As previously mentioned, at least some of the heat produced by the first heatsink and second heatsink is introduced or emitted into the canopy enclosure.

To provide improved thermal management of the heat produced by the outdoor luminaire 200, the upper portion and/or side portion of the canopy comprise(s) one or more air inlets 250 for allowing the passage of external air into the canopy.

The upper portion 211 and/or side portion 212 also comprise(s) one or more air outlets 260 for allowing the passage of internal air, being external air drawn through the air inlets and heated by the first and/or second heatsinks, out of the canopy.

An air inlet or an air outlet can be embodied as a hole, gap or slit within the canopy. Preferably, each air inlet or outlet is formed from an elongate hole or gap. Each air inlet or outlet is preferably a hole completely surrounded or bounded by material of the canopy, to provide improved structural integrity of the canopy.

In this way, the outdoor luminaire provides a mechanism for evacuating or dispersing heat introduced into the canopy enclosure by the first/second heatsinks. The air inlet(s) and the air outlet(s) thereby provide a path for fresh or cooler air to flow through the canopy enclosure to push air heated by the heatsinks out of the canopy enclosure.

To improve the effect of heat dissipation from the canopy enclosure, one or more air inlets may be positioned on the side portion 212 of the canopy enclosure 210 and one or more air outlets may be positioned on the upper portion 211 of the canopy enclosure 210. This achieves a chimney effect, in which cool air is drawn in from a lower position or location, and warmed or heated air is emitted from a higher position or location.

Thus, when the luminaire is installed, the air inlet(s) may be located below the air outlet(s). As warm air rises above cool air, this makes use of a chimney or stack effect to encourage the movement of air through the air inlet(s) and to the air outlet(s). As the heatsinks are positioned between the air inlet(s) and the air outlet(s), air drawn in by the canopy enclosure is heated and expelled out of the air outlets.

The proposed canopy enclosure thereby provides a means for good or improved thermal management of an outdoor luminaire.

To improve the heat dissipation by the second heatsink, the second heatsink 240 may comprise a second set of fins 241 that are configured to extend toward the upper portion 211 of the canopy 210. This can improve or encourage heat dissipation towards the upper portion of the canopy, and therefore towards any air outlets 260 positioned in the upper portion.

The first set of fins and the second set of fins may be angled with respect to one another. For instance, the first and second set of fins may be perpendicular to one another. The angle (θ) between the first set of fins and the second set of fins is preferably $30° \leq \theta \leq 90°$, e.g., $60° \leq \theta \leq 90°$, e.g., $80° \leq \theta \leq 90°$. This approach encourages the movement and distribution of air within the canopy housing in different directions and directional flows, further improving the thermal management of the luminaire.

In some other examples, the first and second set of fins are aligned in parallel.

Each fin of the first set of fins may be parallel to one another, just as each fin of the second set of fins may be parallel to one another.

To achieve improved thermal management, the air inlet(s) may comprise an elongate hole extending in a first direction along the side portion of the canopy. The first direction may be perpendicular to a direction in which each fin of the first set of fins lie. This arrangement is illustrated in FIG. 2, and encourages airflow through the air inlet(s) and past the fin(s) of the first heatsink. This improves the dissipation of heat into the moving cool air.

Thus, this approach provides an improved mechanism for encouraging the flow of air through the canopy enclosure.

The outdoor luminaire 200 may further comprise a planar element 270. The planar element 270 is a substantially planar or flat piece of material. The planar element is mechanically connected to the first heatsink 120. In particular, the planar element 270 may be mounted on top of the first heatsink, i.e., to cover at least a portion of the first set of fins 121.

The planar element 270 is housed by/in the canopy enclosure.

In preferred examples, the planar element is thermally conductive, e.g., is made from a thermally conductive material such as a metal.

Such a thermally conductive planar element 270 may be configured to be thermally connected to the first heatsink. In this way, the planar element can act as an extra heatsink or heat distribution element for distributing heat (from the first heatsink) about the canopy enclosure. This can improve the thermal management of the outdoor luminaire. In some examples, the thermally conductive planar element 270 is further thermally coupled to the second heatsink 240. Thus, the planar element may provide a thermal path (a path that is thermally conductive) between the first heatsink 120 and the second heatsink 240. This further improves distribution of heat about the canopy enclosure. The light source is likely to produce a greater amount of (waste) heat, compared to the wireless module 230. This is due to the reduced efficiency of the light source compared to the wireless module. It would therefore be advantageous to improve the dissipation of heat from the first heatsink by thermally coupling the first heatsink to the second heatsink via the planar element. This improves the thermal management of the outdoor luminaire.

In some examples, the planar element is positioned between the first heatsink and the second heatsink. In particular, the second heatsink may be closer to the upper portion of the canopy than the planar element, and the planar element may be closer to the upper portion of the canopy than the first heatsink. This arrangement encourages the movement of heat from the first heatsink towards the upper portion of the canopy (and out of any air outlets positioned there). This provides an improved thermal path for dissipating heat out of the luminaire.

In some preferred examples, and as illustrated, the first heatsink is more proximate to the air inlet(s) than the second heatsink. This approach recognizes that there is likely to be a greater amount of unwanted or excess heat produced by the light source compared to the wireless module. It would therefore be advantageous to first attempt to dissipate heat from the (likely hotter) first heatsink before the second heatsink.

In some preferred examples, and as illustrated, the first heatsink is less proximate to the air outlet(s) than the second heatsink. This provides a particularly advantageous path for airflow from the air inlet(s) to the air outlet(s).

Preferably, the planar element 270 covers between 20% and 80% of the first heatsink 190. By not covering the entirety of the first heatsink 190, a path is created for airflow around the sides of the planar element 270, which further improves the dissipation of heat away from the first heatsink.

The planar element 270 may, for instance, cover between X % and Y % of the first heatsink 190. The value of X may be: 20, 30, 40 or 50. The value for Y may be 60, 70, 80. Other suitable values would be apparent to the person skilled in the art.

If the planar element 270 is also thermally conductive, this approach acts to provide a thermal path for heat dissipation from the antenna module(s). The antenna module(s) or antenna mount(s) would also be able to act as heatsinks in themselves, to provide further paths for dissipation of heat throughout the canopy enclosure. This effect is enhanced by the antenna mounts extending towards the upper portion of the canopy, as the heat is directed toward the upper portion of the canopy, enhancing a chimney effect of the thermal management for the luminaire.

Thus, in some preferred examples, the antenna mount(s) are thermally conductive or made from a thermally conductive material, such as metal.

The bounds of the planar element 270 may define the location of the one of more antenna modules 221, 222, 223, 224 and/or the antenna mounts 227 of the antenna system 220. In particular, each antenna module 221, 222, 223, 224 and/or antenna mount 227 may be positioned along or formed against a different edge of the planar element 270. In this way, the planar element acts as a guide or mechanism for defining the position of the antenna module(s). The planar element can thereby define locations for the antenna module (s) to achieve a desired or required radio signal alignment for the wireless module 230.

By way of example only, the planar element may define the position of the antenna module(s) such that the antenna modules are aligned in a cross-shaped arrangement. In such a cross-shaped arrangement the angle between the line of sight of antenna modules is 90° (i.e. ß=) 90°. In this way, the radiation patterns of the four antenna modules is effectively able to cover a 360° range in the horizontal plane for improved communication purposes.

This approach advantageously increases an ease of installing or positioning the antenna module(s) in a desired or appropriate location for the wireless module.

In one preferred embodiment, the planar element 270 and the antenna mount(s) 227 are formed from a single, uniform piece of material. In other words, the planar element 270 and the antenna mount(s) may form a single monolithic element. Thus, each antenna mount is integrally formed with the planar element. This approach provides a simple mechanism for controlling and/or defining the location of the antenna mounts and the antenna modules using a single element.

In particularly preferably examples, the planar element 270 and each antenna mount 227 is formed from a same continuous sheet, wherein one or more bent portions of the continuous sheet define one or more antenna mounts and a non-bent portion of the continuous sheet defines the planar element. This approach provides a cost effective and resource-efficient mechanism for defining the position(s) of the antenna mount(s).

The illustrated canopy 210 is formed of two parts, which are detachable from one another. In particular, a first part connects to the luminaire housing 110 and a second part connects to the first part. The second part may be detachable from the first part. The second part may, for instance, comprise the air outlets 260.

In some examples, the second part is positioned in proximity to the wireless module. This allows for ease of access to the wireless module (e.g., for repairs and/or maintenance of the wireless module).

Figure 3:
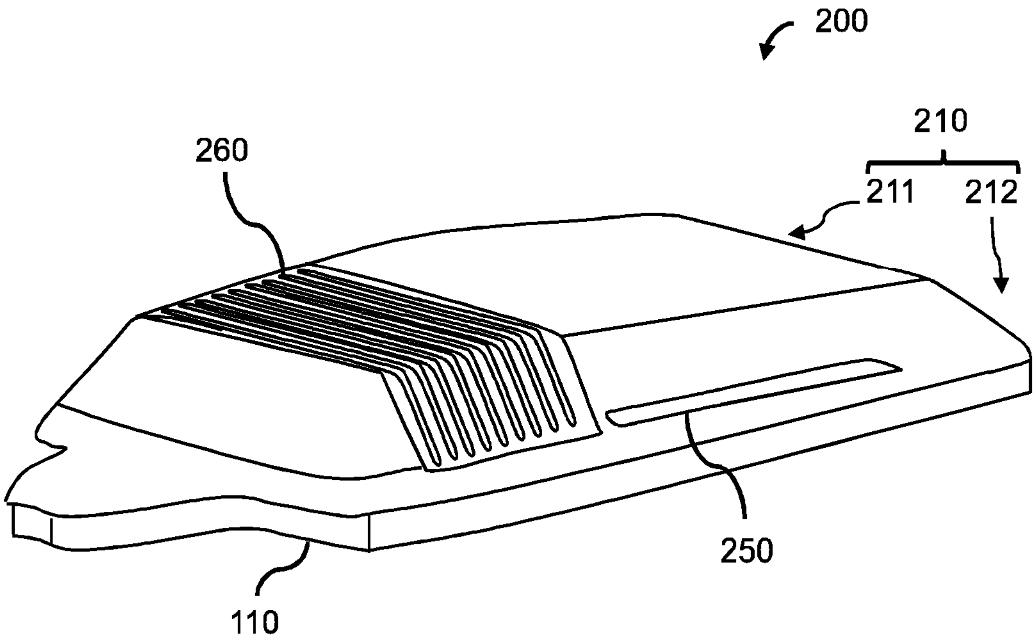
FIG. 3 illustrates the luminaire.

FIG. 3 illustrates the luminaire 200 in a non-exploded form. This clearly demonstrates how the canopy 210 and the uppermost surface of the luminaire housing come together to form another enclosure.

Figure 4:
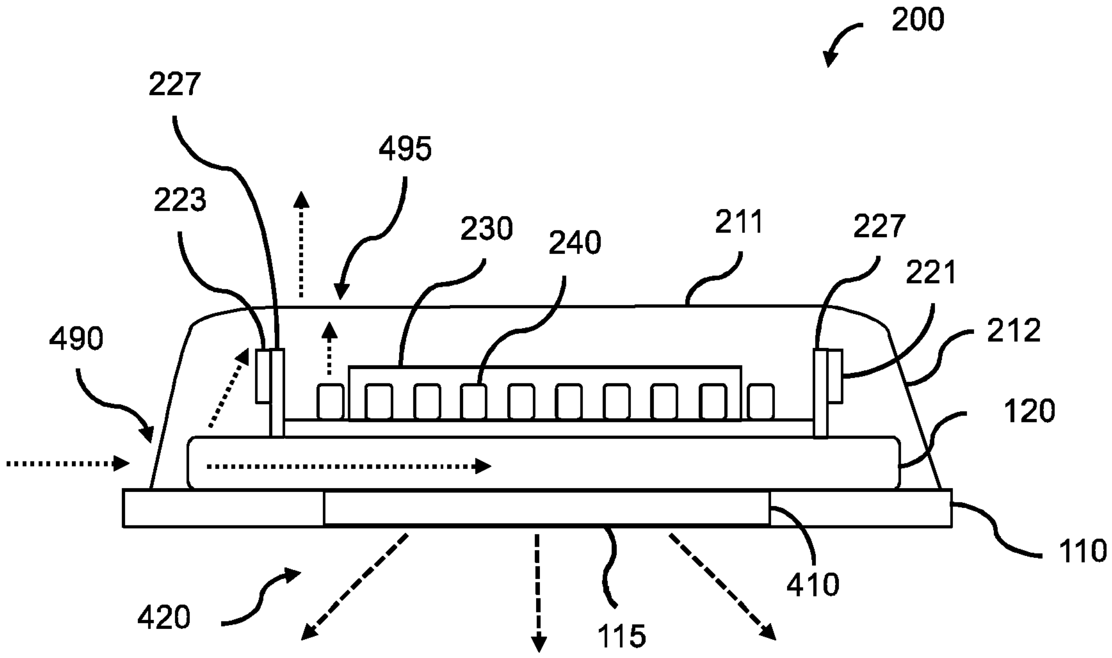
FIG. 4 provides a cross-sectional view of the luminaire.

FIG. 4 illustrates a cross-section of the luminaire 200 according to an embodiment. The cross-section faces a direction of the wireless module 230, and is taken from a position along the planar element 270.

FIG. 4 illustrates how the luminaire housing 110 comprises or encloses the light source 410. The light source is configured to generate light 420 (illustrated with dashed lines) that is output via the light exit window 115 of the luminaire housing 110.

The light source may comprise any suitable element that emits lights, such as a tubular LED, an array of LEDs, a halogen bulb and/or fluorescent lamp.

FIG. 4 also illustrates exemplary airflow paths through the outdoor luminaire 200. The airflow paths are illustrated with dotted lines, and demonstrate how air is able to flow through an air inlet (at an air inlet position 490) around the heatsinks 120, 240 and out an air outlet (at an air outlet position 495).

In particular, air is able to flow along the fin(s) of the first heatsink 120 to cool the first heatsink and thereby dissipate heat conducted to the first heatsink. Heated air is able to rise around the sides of the planar element, to provide a path for heated air to move towards the air outlet(s).

If thermally conductive, the planar element 270 also encourages the movement of heat towards the air outlet, by providing a thermal path for heat. This effect is enhanced if the second heatsink is thermally coupled to the planar element, as the heat will be further encouraged (by the second heatsink) to move towards the air outlet, providing an even more enhanced mechanism for encouraging the movement of heat out of the luminaire.

The antenna mount(s) 227 may be formed from a thermally conductive material such as metal. In this way, the antenna mounts are able to conduct heat towards the upper portion 211 of the canopy.

The skilled person will appreciate that any herein described outdoor luminaire may be mounted on or carried by a pole (not shown) or mast to form a streetlight. Suitable poles/masts and mounting mechanisms are well known to the skilled person.

Embodiments may also provide an outdoor lighting system comprising a plurality of streetlights. The plurality of streetlights may be in mutual line of sight and/or communication. The wireless modules of each of the plurality of streetlights may be in wireless communication with one another, to effectively form a network of wireless modules. This can be used to provide wireless connectivity to mobile devices in the vicinity of the network of wireless modules.

The plurality of streetlights may number at least ten, thousand, or ten thousand or even over hundred thousand for very extensive communication networks covering a whole city, country and/or continent.

Using the above-described outdoor luminaire in the fixtures of the outdoor lighting system, it is possible to create a mesh network using the wireless modules of such luminaires. The mesh network can, for instance, be used to provide wireless connectivity to mobile devices in the vicinity of the network of wireless modules according to known principles.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa. Any reference signs in the claims should not be construed as limiting the scope.

The invention claimed is:

1. An outdoor luminaire for a streetlight comprising:

a luminaire housing comprising a light exit window and a first heatsink comprising a first set of fins;

a light source positioned in the luminaire housing between said light exit window and said first heatsink, and configured to emit light through the light exit window;

a canopy comprising an upper portion that covers a portion of an uppermost surface of the luminaire housing and a side portion configured to connect the upper portion of the canopy to the luminaire housing to thereby form a canopy enclosure;

an antenna system housed by the canopy enclosure, for transmitting and/or receiving wireless signals;

a wireless module housed by the canopy enclosure, communicatively coupled to the antenna system and configured to control the transmission of transmitted wireless signals by the antenna system and/or process receiving wireless signals received at the antenna system; and a second heatsink at least partly housed by the canopy enclosure, in thermal contact with the wireless module, wherein:

a portion of the first set of fins is housed by the canopy enclosure;

the upper portion and/or side portion of the canopy comprise one or more air inlets, for allowing the passage of external air into the canopy, and one or more air outlets for allowing the passage of internal air, being external air drawn through the air inlets and heated by the first and/or second heatsinks, out of the canopy; and the first set of fins is configured to extend toward the upper portion of the canopy, wherein the antenna system comprises:

a planar element mechanically connected to the first heatsink and arranged to cover a top of a portion of the first set of fins, and one or more antenna modules for transmitting and/or receiving the wireless signals for the wireless module, each antenna module being electrically connected to the wireless module, wherein for each antenna module an antenna mount is configured to support the antenna module, and where each antenna mount is integrally formed with the planar element.

2. The outdoor luminaire of claim 1, wherein the planar element is thermally conductive and is thermally coupled to the first heatsink.

3. The outdoor luminaire of claim 2, wherein the planar element is thermally coupled to the second heatsink.

4. The outdoor luminaire of claim 1, wherein the planar element covers between 20% and 80% of the first heatsink.

5. The outdoor luminaire of claim 1, wherein the antenna mount is configured to extend toward the upper portion of the canopy.

6. The outdoor luminaire of claim 1, wherein the planar element and each antenna mount is formed from a same continuous sheet, wherein one or more bent portions of the continuous sheet define one or more antenna mounts and a non-bent portion of the continuous sheet defines the planar element.

7. The outdoor luminaire of claim 1, wherein the second heatsink comprises a second set of fins configured to extend toward the upper portion of the canopy.

8. The outdoor luminaire of claim 1, wherein the second heatsink comprises a second set of fins, wherein the first set of fins and the second set of fins are angled with respect to one another.

9. The outdoor luminaire of claim 1, wherein the one or more air inlets are positioned in the side portion of the canopy.

10. The outdoor luminaire of claim 1, wherein the one or more air outlets are positioned in the upper portion of the canopy.

11. The outdoor luminaire of claim 1, wherein the first heatsink is more proximate to the one or more air inlets than the second heatsink.

12. A streetlight comprising:

a pole;

the outdoor luminaire, of claim 1, mechanically mounted to the pole.

* * * * *